(12) United States Patent
Takai

(10) Patent No.: US 9,041,857 B2
(45) Date of Patent: May 26, 2015

(54) IMAGING APPARATUS

(75) Inventor: Kenta Takai, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 13/435,096

(22) Filed: Mar. 30, 2012

(65) Prior Publication Data
US 2012/0257097 A1 Oct. 11, 2012

(30) Foreign Application Priority Data
Apr. 8, 2011 (JP) ................................. 2011-086338

(51) Int. Cl.
| | |
|---|---|
| H04N 5/225 | (2006.01) |
| G03B 9/10 | (2006.01) |
| G03B 11/00 | (2006.01) |
| G03B 17/56 | (2006.01) |
| G02B 5/20 | (2006.01) |
| G02B 26/02 | (2006.01) |

(52) U.S. Cl.
CPC *G03B 9/10* (2013.01); *G03B 11/00* (2013.01); *G03B 17/565* (2013.01); *G02B 5/205* (2013.01); *G02B 26/023* (2013.01)

(58) Field of Classification Search
CPC . H04N 5/2253; H04N 5/2254; H04N 5/2251; H04N 5/2257; H04N 5/2252; H04N 5/23209; H04N 2101/00; H04N 5/23293; H04N 5/232; G03B 9/10; G03B 11/00; G03B 17/565; G02B 26/023; G02B 5/205
See application file for complete search history.

(56) References Cited

U.S. PATENT DOCUMENTS

| | | | | |
|---|---|---|---|---|
| 4,551,763 | A * | 11/1985 | Swinehart et al. | 348/368 |
| 7,899,311 | B1 * | 3/2011 | Kearney et al. | 396/12 |
| 2004/0207036 | A1 * | 10/2004 | Ikeda | 257/432 |
| 2005/0073604 | A1 * | 4/2005 | Umezu | 348/363 |
| 2005/0151872 | A1 * | 7/2005 | Kuo | 348/335 |
| 2005/0207750 | A1 * | 9/2005 | Hirota | 396/541 |
| 2006/0093351 | A1 * | 5/2006 | Lee | 396/505 |
| 2006/0239681 | A1 * | 10/2006 | Viglione et al. | 396/535 |
| 2007/0058971 | A1 * | 3/2007 | Tsuda | 396/529 |
| 2008/0013149 | A1 * | 1/2008 | Viglione et al. | 359/227 |
| 2008/0024654 | A1 * | 1/2008 | Shinohara | 348/362 |
| 2008/0143868 | A1 * | 6/2008 | Tsuchiya et al. | 348/360 |
| 2009/0244360 | A1 * | 10/2009 | Ueda et al. | 348/360 |
| 2010/0060775 | A1 * | 3/2010 | Shintani | 348/335 |
| 2012/0182469 | A1 * | 7/2012 | Shintani | 348/374 |
| 2013/0135522 | A1 * | 5/2013 | Jang et al. | 348/373 |

FOREIGN PATENT DOCUMENTS

JP 2005-266210 A 9/2005

* cited by examiner

*Primary Examiner* — Twyler Haskins
*Assistant Examiner* — Wesley J Chiu
(74) *Attorney, Agent, or Firm* — Sony Corporation

(57) ABSTRACT

An imaging apparatus has an optical lens having an optical axis in a first axial direction; an imaging element facing the optical lens in this direction; an illumination adjustment unit having an illumination adjustment part adjusting a luminous flux incident on the imaging element from the optical lens, with the illumination adjustment part being arranged on the optical axis by being inserted between the optical lens and the imaging element in a second axial direction orthogonal to the first axial direction; and a supporting member having a first supporting part supporting the lens, a second supporting part supporting the imaging element, and a coupling part coupling the first and second supporting parts to each other, the supporting member being configured to form a space, into which the illumination adjustment unit is inserted in a third axial direction orthogonal to the first and the second axial directions.

11 Claims, 9 Drawing Sheets

IMAGING APPARATUS

CROSS-REFERENCE TO RELATED APPLICATION

The present application claims priority from Japanese Patent Application No. JP 2011-086338 filed in the Japanese Patent Office on Apr. 8, 2011, the entire content of which is incorporated herein by reference.

BACKGROUND

The present disclosure relates to an imaging apparatus having an insertable and removable shutter mechanism.

An imaging apparatus having an insertable and removable shutter mechanism and a driving unit driving this mechanism is available as a camera utilizing, for example, a silver film and an imaging element (see Japanese Unexamined Patent Application Publication No. 2005-266210). In an apparatus that captures, for example, video images in use of an imaging element such as a complementary metal oxide semiconductor (CMOS) imager, a mechanical shutter, a filter, or the like detachable to and from an imaging optical system is used.

SUMMARY

These apparatuses, however, exhibit structural problems, in which, for example, the size of a shutter mechanism has to be restricted and an insertion/removal mechanism therefor becomes complex. These problems may impair production efficiency and pose difficulty in ensuring better maintenance and greater freedom in apparatus structural designing.

In view of the circumstances as described above, there is a need for an imaging apparatus that ensures better maintenance and greater freedom in apparatus structural designing.

According to an embodiment of the present disclosure, there is provided an imaging apparatus including an optical lens, an imaging element, an illumination adjustment unit, and a supporting member.

The optical lens has an optical axis in a first axial direction.

The imaging element faces the optical lens in the first axial direction.

The illumination adjustment unit has an illumination adjustment part adjusting a luminous flux incident on the imaging element from the optical lens, with the illumination adjustment part being arranged on the optical axis by being inserted between the optical lens and the imaging element in a second axial direction orthogonal to the first axial direction.

The supporting member has a first supporting part supporting the optical lens, a second supporting part supporting the imaging element, and a coupling part coupling the first supporting part and the second supporting part to each other. The supporting member forms a space, into which the illumination adjustment unit is inserted in a third axial direction orthogonal to the first axial direction and the second axial direction, with the space being formed by the first supporting part, the second supporting part, and the coupling part.

In the imaging apparatus, the illumination adjustment part is arranged on the optical axis of the optical lens when the illumination adjustment unit is inserted between the optical lens and the imaging element. Here, since the supporting member forms a space into which the illumination adjustment unit is inserted in the third axial direction, even if the size of the illumination adjustment unit is enlarged, the illumination adjustment unit can be combined with the supporting member such that the illumination adjustment part is arranged on the optical axis of the lens.

The above imaging element is not limited to such configurations. For example, in a case where a CMOS imager can be adopted, the illumination adjustment unit may be a mechanical shutter having a light blocking mechanism blocking, as the illumination adjustment part, the incident luminous flux at a predetermined cycle.

Even for an illumination adjustment unit having a comparatively large light blocking mechanism like a mechanical shutter, the space provided by means of the supporting member may overcome the limitations to the size of the illumination adjustment unit to be combined with the supporting member.

The illumination adjustment part may be a filter adjusting a light quantity of the incident luminous flux.

By employing such an illumination adjustment part, a luminous flux of an object may be incident on an imaging element at a predetermined light quantity.

The illumination adjustment unit may further have a main body including a first engaging part engaging with the first supporting part, a second engaging part engaging with the second supporting part, and an insertion end facing the coupling part in the second axial direction.

With an engaging structure being formed between the main body and the supporting member, positioning of the illumination adjustment part relative to the optical lens and the imaging element is enabled when the illumination adjustment unit is combined with the supporting member. This makes it unnecessary to adjust an optical axis at later stages.

The illumination adjustment part may have an opening formed in the main body to face the space, and an illumination adjustment member arranged on the optical axis via the opening. In this case, the first engaging part and the second engaging part are formed at a peripheral edge of the opening.

With the opening of the main body being formed to serve as an engaging part, the interior of the main body is insulated from the exterior thereof by the supporting member after combining the illumination adjustment unit with the supporting member.

The imaging apparatus may further have a seal member having a first seal part sealing a gap between the first supporting part and the first engaging part, a second seal part sealing a gap between the second supporting part and the second engaging part, and a third seal part sealing a gap between the coupling part and the insertion end.

By means of this seal member, the engaging part is tightly sealed, which improves both dust-proof and light blocking properties therefor.

The illumination adjustment unit may further have a pair of guiderails extending in the second axial direction to face each other in the third axial direction, with the illumination adjustment part being interposed therebetween, the pair of guiderails being fixed to the main body. In this case, the support member has guides engaging with the pair of guiderails respectively and guiding movement of the illumination adjustment unit in the second axial direction.

By this configuration, easier combination of the illumination adjustment unit with the supporting member is ensured.

The imaging apparatus may further include a base supporting commonly the supporting member and the illumination adjustment unit.

This base allows the illumination adjustment unit to be securely fixed to the supporting member.

The illumination adjustment unit may further have an elastic member disposed between the base and the main body so that the main body is supported elastically by the base.

This elastic member enhances effects of insulating a vibration that arises when the illumination adjustment unit is operated.

As explained above, according to the present disclosure, an imaging apparatus that allows extra degrees of freedom in designing the structure of an illumination adjustment unit as well as better maintenance can be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Entire Structure of Imaging Apparatus

Figure 1:
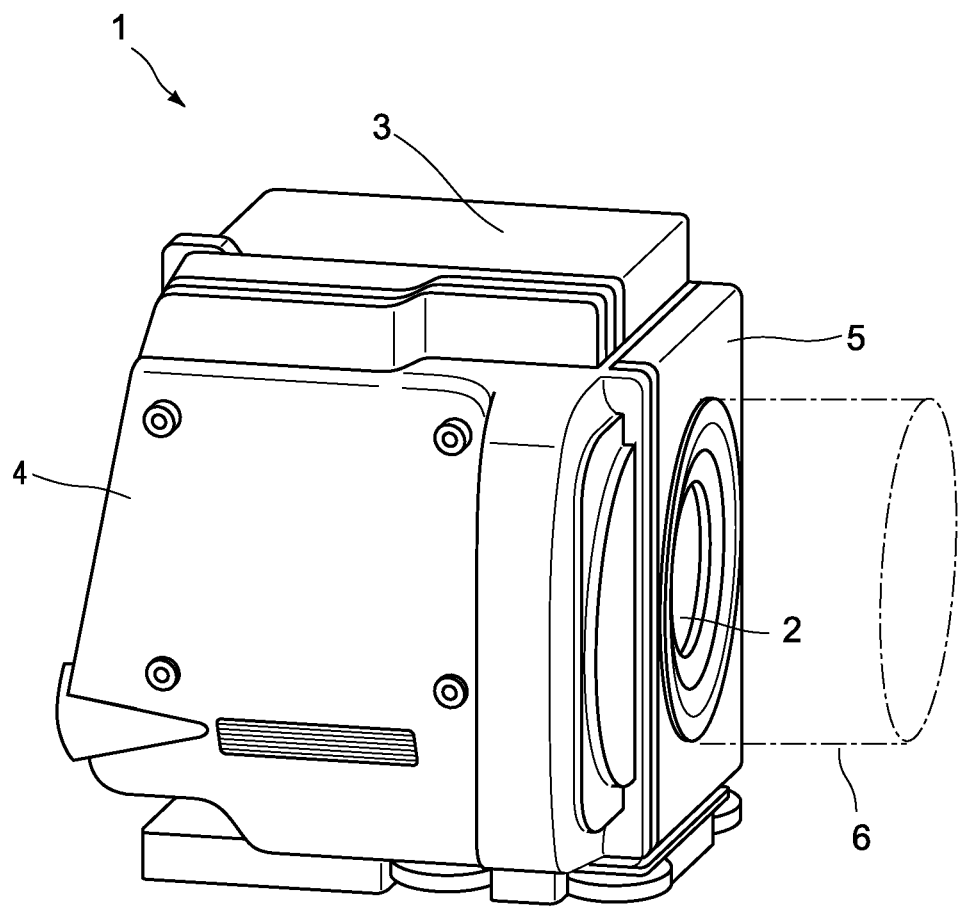
FIG. 1 is a schematic perspective view of an entire structure of an imaging apparatus according to an embodiment of the present disclosure.
Figure 2:
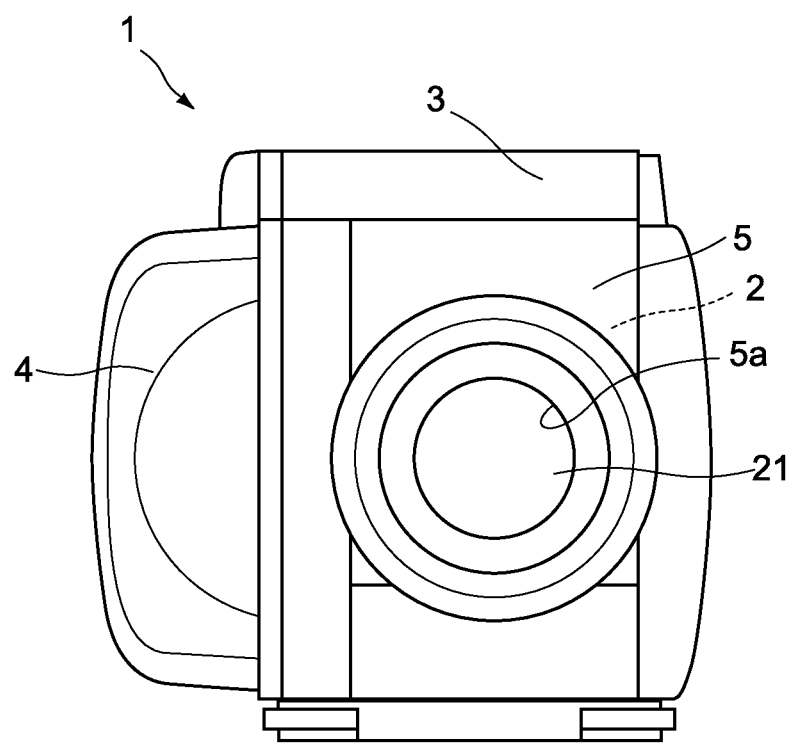
FIG. 2 is a schematic front view of the entire structure of the imaging apparatus according to the embodiment of the present disclosure.
Figure 2:
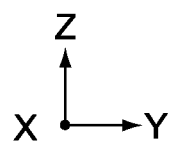

FIG. 1 is a schematic perspective view of an imaging apparatus 1 according to an embodiment of the present disclosure, and FIG. 2 is a schematic front view thereof. The imaging apparatus 1 is a camera that captures video images and that is configured to have an imaging module 2, a casing 3 that houses the imaging module 2, and a side cover 4. The imaging apparatus 1 also has an optical lens 6 and a front base (a base) 5. The casing 3, the side cover 4, and the front base 5 are configured to serve as exterior components of the imaging apparatus 1. In FIG. 1 to FIG. 9, a Z-axis (a third axis) coincides with a vertical direction (a direction of gravitational force), while an X-axis (a first axis) and a Y-axis (a second axis) coincide with a planar direction.

(Imaging Module)

Figure 3:
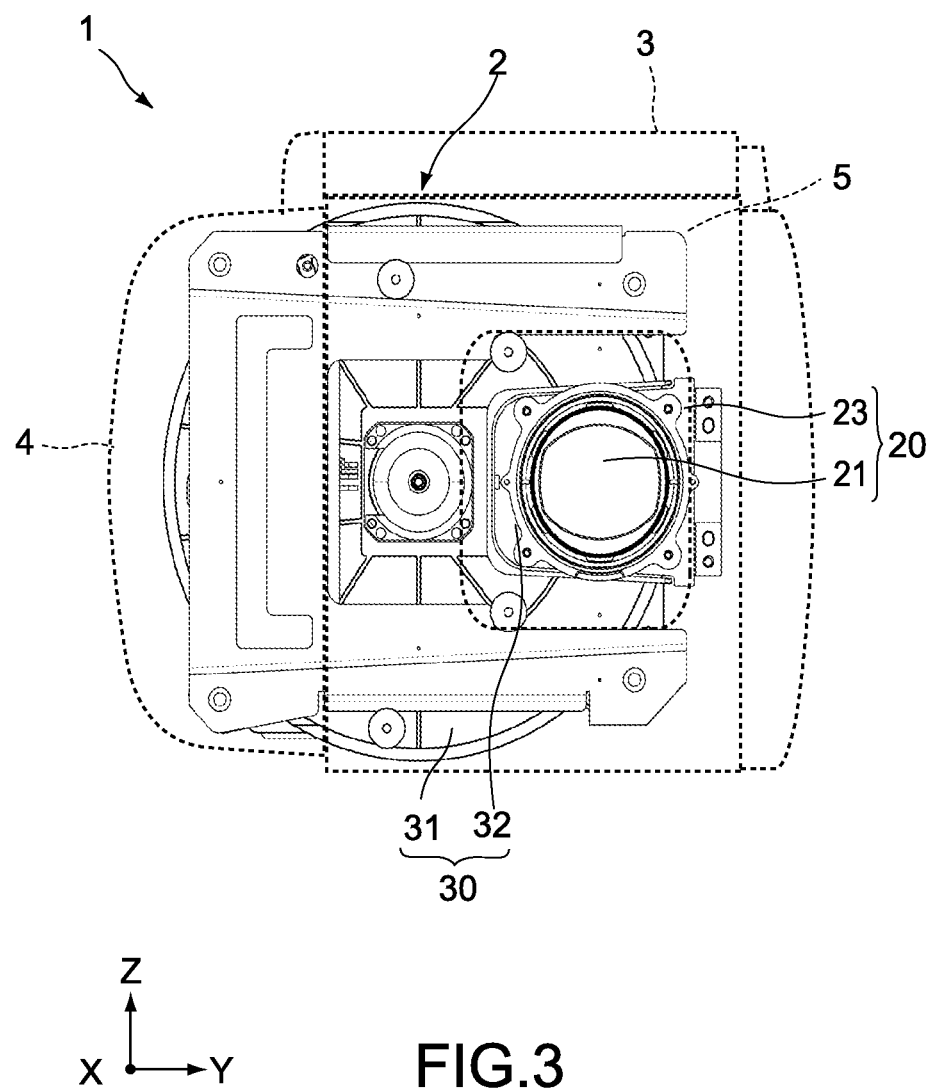
FIG. 3 is a front view of a structure of an imaging module according to the embodiment of the present disclosure.
Figure 4:
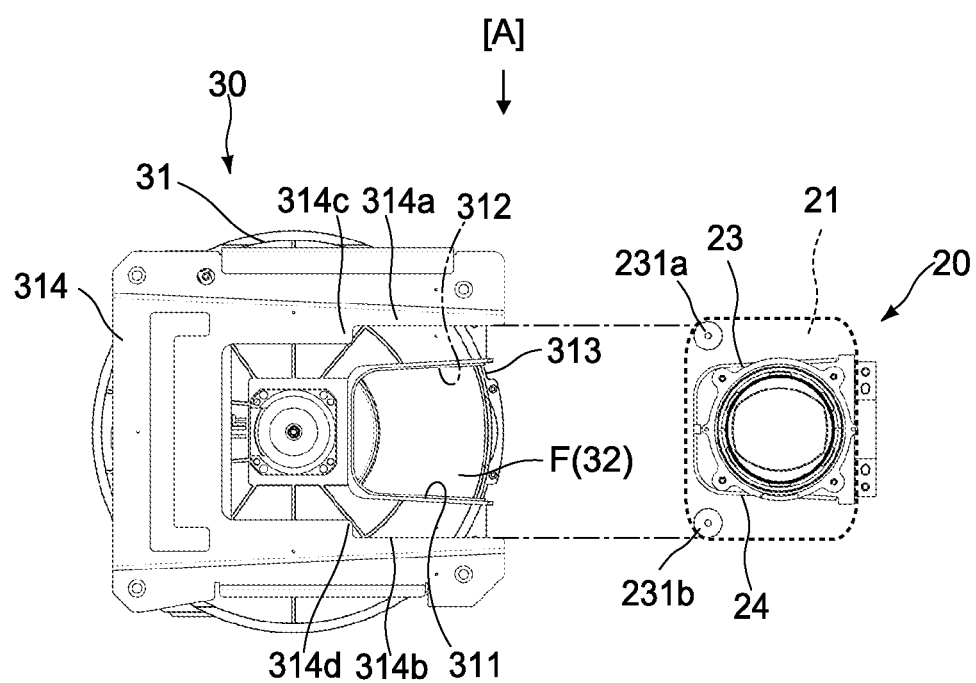
FIG. 4 is a front view of a main part of the imaging module shown separately from other parts thereof.
Figure 5:
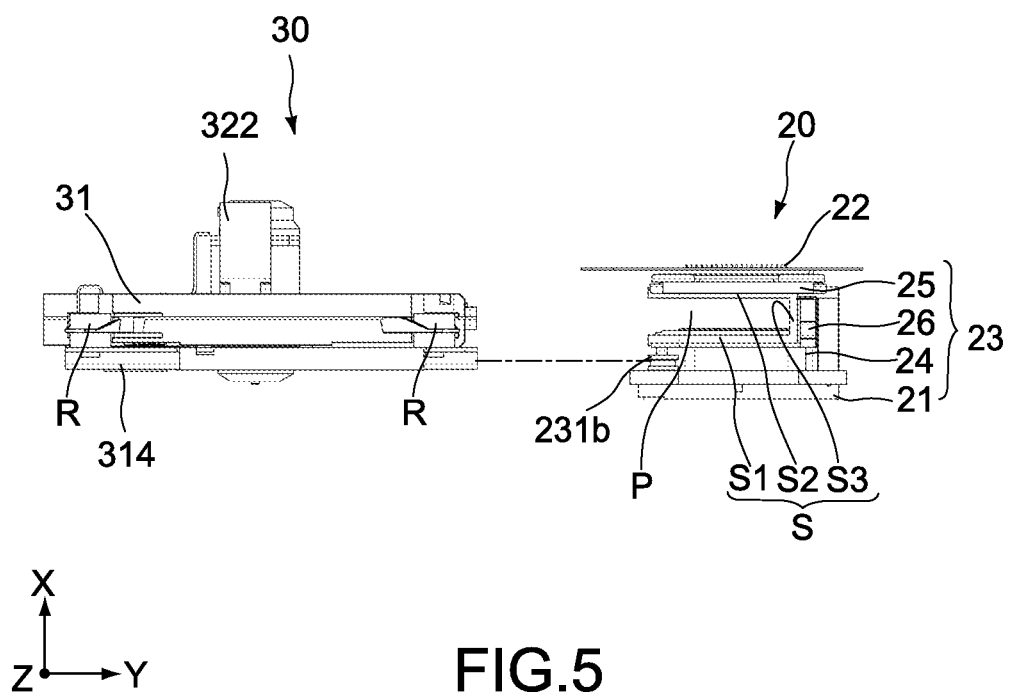
FIG. 5 is a top view along arrow direction A in FIG. 4.

FIG. 3 shows a front view of the imaging module 2 in the imaging apparatus 1. FIG. 4 shows an exploded front view of a main part of the imaging module 2, and FIG. 5 is a top view along arrow direction A in FIG. 4. The imaging module 2 has an optical block 20 and a mechanical shutter 30, both of which are combined with each other in the Y axial direction to constitute the imaging module 2. In FIG. 3, the casing 3, the side cover 4, and the front base 5 are illustrated with dashed lines.

The optical block 20 has a lens mount 21 supporting the optical lens 6, an imaging element 22, and a supporting member 23 supporting the lens mount 21 and the imaging element 22. The lens mount 21 is exposed to outside through an opening 5a formed in the front base 5. The mechanical shutter has a disk-shaped main body 31, and an illumination adjustment part 32 provided in the main body 31.

The term "illumination adjustment" signifies the adjustment of a luminous flux that emerges from the optical lens 6. More specifically, the illumination adjustment means the adjustment of the luminous flux incident on the imaging element 22, as represented by, for example, modifying the intensity of incident light or blocking the incident light. According to the present embodiment, the mechanical shutter 30 that serves as an illumination adjustment unit is employed, with the main body 31 being configured larger than the optical block 20.

The optical lens 6 has an optical axis in the X axial direction and is supported by the lens mount 21 disposed along a plane orthogonal to the X-axis. Typically, the optical lens 6 is an interchangeable lens that can be replaced depending on image capturing purposes. The optical lens 6 may be a fixed lens. In a case where a fixed lens is used, an optical lens may be provided in place of the lens mount 21.

The luminous flux that has passed through the optical lens 6 receives predetermined illumination adjustment processing by the illumination adjustment part 32 of the mechanical shutter 30. The luminous flux that has passed through the illumination adjustment part 32 forms an image on the imaging element 22 disposed opposite the optical lens 6 (lens mount 21) in the X axial direction.

The imaging module 2 according to the present embodiment is formed by combining in the Y axial direction the optical block 20 with the mechanical shutter 30, but these components may be separated from each other. Next, in reference to a schematic view of these components in a separated state, the configuration of the optical block 20 and the mechanical shutter 30 is explained further.

(Optical Block)

As shown in FIG. 5, the optical block 20 has the lens mount 21, the imaging element 22, and the supporting member 23. The supporting member 23 has a first supporting part 24 supporting the lens mount 21, a second supporting part 25 supporting the imaging element 22, and a coupling part 26 coupling the first supporting member 24 and the second supporting member 25 to each other.

The first supporting part 24 is arranged along a plane orthogonal to the X-axis. By this arrangement, the optical lens 6 is supported at the first supporting part 24 via the lens mount 21 such that the optical axis of the optical lens 6 is in parallel with the X-axis. The mount 21 according to the present embodiment serves as a partial section of the first supporting part 24.

The second supporting part 25 is arranged along a plane orthogonal to the X-axis, with the imaging element 22 being supported by the second supporting part 25 such that an imaging surface of the imaging element 22 is disposed to face the lens mount 21 in the X axial direction. A distance between the imaging element 22 and the lens mount 21 is defined by the coupling part 26. This distance is determined in accordance with a distance in which the luminous flux passing through the optical lens 6 forms an image on the imaging element 22, in other words, in accordance with a focal distance of the optical lens 6.

As the imaging element 22, for example, a CMOS imager or a charge coupled device (CCD) imager may be employed. In the present embodiment, the CMOS imager is used. The CMOS imager is a solid-state imaging element that uses a CMOS. This imager delivers superior performance at lower cost and lower power consumption than the CCD imager.

The first supporting part 24 and the second supporting part 25 of the supporting member 23 face each other in the X axial direction. According to the present embodiment, these supporting parts are formed as, for example, rectangular, circular-shaped frames to support the peripheral edges of the lens mount 21 and the imaging element 22. The shapes and sizes of these frames are not particularly limited and may take on any shapes and sizes as long as these supporting parts do not block an imaging optical path and are able to support the imaging lens 6 and the imaging element 22. Moreover, there is not limitation to material of the supporting member 23 as long as this member can exhibit a sufficient strength. Typically, the material is metal.

The coupling part 26 of the supporting member 23 couples respective ends of the first supporting part 24 and the second supporting part 25, which extend in the Z axial direction, to each other such that the first supporting part 24 and the second supporting part 25 maintain a predetermined distance therebetween.

A space P is a space surrounded by the first supporting part 24, the second supporting part 25, and the coupling part 26. The space P is formed to allow the mechanical shutter 30 to be inserted into this space in the Z axial direction. According to the present embodiment, the supporting member 23 has a substantially hexahedron shape. The space P has a shape whose two sides opposite to each other in the Z axial direction are open, and whose one side, which opposes the coupling member 26, in the Y axial direction is open.

(Mechanical Shutter)

The mechanical shutter 30 has the metallic main body 31 and the illumination adjustment part 32. The main body 31 is formed of two shallow pan-shaped shells that are combined in the X axial direction. In accordance with the present embodiment, the main body 31 has a disk shape that is larger than the optical block 20. The main body 31 has a size and shape to be fitted with the space P. There is no particular limitation to the size and shape thereof as long as intrinsic functions of the illumination adjustment part 32 are not compromised.

The mechanical shutter 30 has a light blocking mechanism that blocks the luminous flux emitted from the optical lens 6 at a predetermined cycle. The light blocking mechanism is constituted by a shutter blade that serves as an illumination adjustment member arranged rotatably inside the main body 31, a rotary shaft that supports the shutter blade, and a driving part 322 that rotates the shutter blade. The illumination adjustment part 32 is formed of an opening F formed in a partial periphery of the main body 31 and the shutter blade exposed to the outside from the opening F. The opening F is formed of two openings, which are formed of the two shells constituting the main body 31, and which face each other in the X axial direction.

The shutter blade typically has two fan-shaped light blocking plates that rotate about the rotary shaft disposed at substantially the center inside the main body 31. There is no limitation to the number of light blocking plates and the shape thereof. These plates may be provided suitably to ensure conformity with the prerequisites for exposure time, shutter speed, and the like. The driving part 322 is typically an electric motor that drives at a predetermined speed the shutter blade to rotate by being connected to the rotary shaft. In the imaging apparatus 1 for capturing video images according to the present embodiment, two shutter blades are rotated to enable image capturing at 120 frames per second. Due to such a configuration, the start and end of the light reception on the imaging element 22 is executed commonly for all pixels in an imaging apparatus using a CMOS imager, whereby video images with no distortion can be captured.

The mechanical shutter 30 produced on the basis of the above configuration is inserted, in the Y axial direction, into the space P of the optical block 20, while the opening F (the illumination adjustment part 32) is arranged on an optical axis of an optical flux of an object to be imaged, with this flux from the optical lens 6 being incident on the imaging element 22.

The space P is formed to be able to receive insertion of the mechanical shutter 30 in the Z axial direction. Hence, even for a comparatively large illumination adjustment unit as represented by the mechanical shutter 30, the illumination adjustment part 32 is able to be combined with the supporting member 23 properly and easily. This all means that extra degrees of freedom in designing the structure of the mechanical shutter 30 and the combination of the mechanical shutter 30 with the optical block 20 are ensured. This facilitates, for example, assembly, repair, parts replacement, and the like of the imaging apparatus, whereby improved maintenance is ensured. Moreover, based on the above configuration, even the comparatively large mechanical shutter 30 is able to be combined with the optical block 20 easily and properly, easing the size restriction on component combination.

Figure 6:
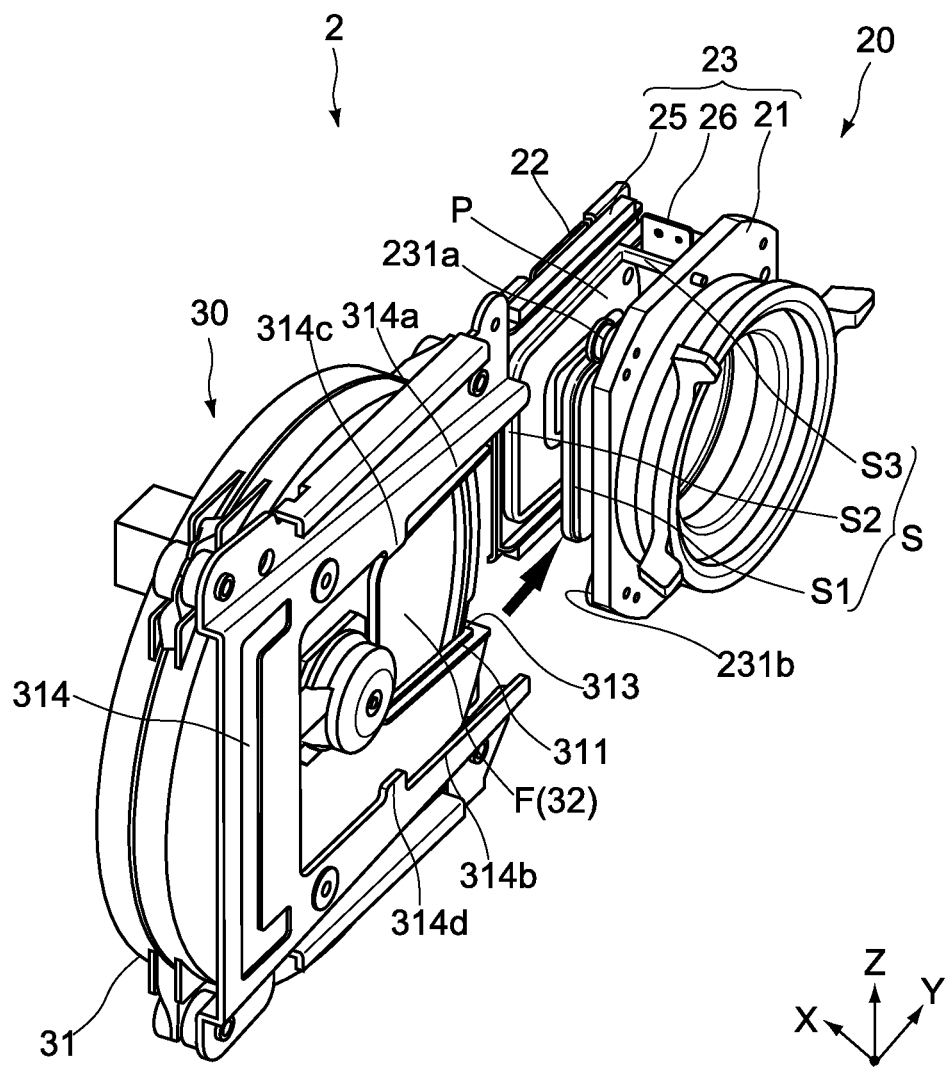
FIG. 6 is a perspective view of the main part of the imaging module shown separately from other parts thereof.
Figure 7:
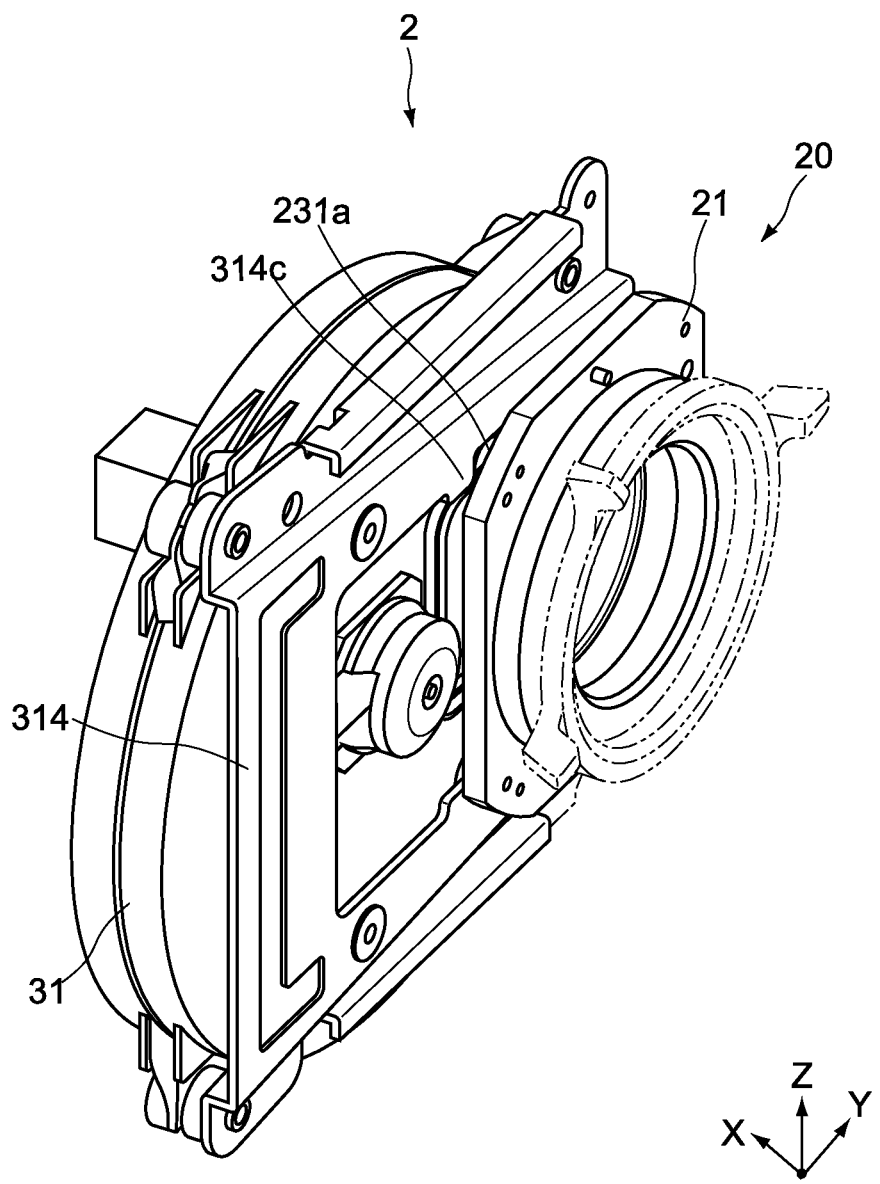
FIG. 7 is a perspective view of the imaging module.

Next, in reference to FIG. 3 to FIG. 7, the structure of combining the optical block 20 with the mechanical shutter 30 is explained in detail. Here, FIG. 6 and FIG. 7 are perspective views showing respectively modes before and after combining the optical block 20 with the mechanical shutter 30; FIG. 6 is a perspective view showing a mode before combining these components, in other words, a mode in which these components are in a separated state; and FIG. 7 is a perspective view showing a mode in which these components are in a combined state.

(Structure of Combining Optical Block with Mechanical Shutter)

The main body 31 of the mechanical shutter 30 has a first engaging part 311, a second engaging part 312, and an insertion end 313.

The first engaging part 311 and the second engaging part 312 are formed at a peripheral edge of the opening F formed in the main body 31. These engaging parts are configured to form engagement with three peripheral edge sections of the first supporting part 24 and the second supporting part 25—not forming engagement with an edge section thereof that is coupled with the coupling part 26.

Here, the first engaging part 311 has a rib structure formed along the peripheral edge of the opening of one of the shells constituting the main body 31, while the second engaging part 312 has a rib structure formed along the peripheral edge of the opening of the other one of the shells constituting the main body 31. The first and second engaging parts 311 and 312 have shapes respectively corresponding to the first and second supporting parts 24 and 25. By combining in the Y axial direction the main body 31 with the supporting member 23, the engaging parts 311 and 312 engage with the supporting parts 24 and 25 respectively.

The insertion end 313 is formed at a side surface of the main body 31 in order to face the coupling part 26 in the Y axial direction inside the space P when the main body 31 is combined with the supporting member 23. According to the present embodiment, the insertion end 313 is formed at the peripheral edge of the main body 31 and has a rib structure provided with the first engaging part 311 and the second engaging part 312 that are contiguous to each other.

Due to the engaging structure between the supporting member 23 and the main body 31 as thus explained, positioning of the illumination adjustment part 32 is enabled relative to the optical lens 6 and the imaging element 22 when combining the main body 31 with the supporting member 23. This structure makes it unnecessary to adjust an optical axis at later stages. Moreover, by forming the engaging structure at the peripheral edge of the opening F, the interior of the main body 31 can be insulated from outside by means of the supporting member 23 after the combination. This makes it possible to ensure enhanced blocking of not only the incident light but also other light.

The imaging module 2 according to the present embodiment further has a seal member S. The seal member S is provided at an engaging section between the main body 31 and the supporting member 23 as shown in FIG. 6. The seal member S includes a first seal part S1 sealing a gap between the first engaging part 311 and the first supporting part 24, a second seal part S2 sealing a gap between the second engaging part 312 and the second supporting part 25, and a third seal part S3 sealing a gap between the coupling part 26 and the insertion end 313.

The seal member S, which is formed of rubbery material, is produced by mold-processing of bending a single rectangular, circular-shaped seal member into the shape of the seal member S. There is no particular limitation to the type of material for this seal member as long as the material exhibits sufficient elasticity and enough tight-fitting and sealing properties.

By providing the seal member S between the supporting member 23 and the main body 31, a sealing property of an engaging section between the mechanical shutter 30 and the optical block 20 is enhanced. This means that an enhanced dust-proof sealing can be obtained in the illumination adjustment part 32, and quality deterioration of a captured image can be prevented.

Moreover, according to the present embodiment, the seal member S effectively inhibits a vibration, which arises when the mechanical shutter 30 is operated, from transmitting to the supporting member 23. This eliminates undesirable impact on the imaging optical system.

The imaging module 2 according to the present embodiment has a guide frame 314 guiding the mechanical shutter 30 to be combined with the optical block 20. The guide frame 314 is fixed to the main body 31 and is provided with a pair of guiderails 314a and 314b facing each other in the Z axial direction, with the opening F being interposed therebetween, and the pair of these guidelines being extended in the Y axial direction as a part of the guide frame 314. To the lens mount 21 of the optical block 20, a pair of guides 231a and 231b, which are able to engage with the pair of guiderails 314a and 314b respectively, are fixed. According to the present embodiment, the guides 231a and 231b are configured as guide rollers capable of engaging with edges of the guiderails 314a and 314b. The configuration therefor is not limited and may have other guide structures having, for example, a column or rail-like shape.

When the mechanical shutter 30 is combined with the optical block 20, first, the guiderails 314a and 314b are engaged with the guides 231a and 231b respectively as shown in FIG. 4 to FIG. 6. Then, the mechanical shutter 30 is inserted into the space P of the optical block 20 in the Y axial direction. Upon this insertion, the guides 231a and 231b travel along the guiderails 314a and 314b in the Y axial direction. This ensures a proper engaging functional relationship between the first and second supporting parts 24 and 25 of the supporting member 23 and the first and second engaging parts 311 and 312 of the main body 31.

In the guide frame 314, protrusions 314c and 314d are formed as terminal ends that regulate the travel of the guides 231a and 231b travelling on the guiderails 314a and 314b respectively. According to the present embodiment, the guides 231a and 231b engage with the protrusions 314c and 314d respectively at a position where the insertion end 313 of the main body 31 is in close contact with the third seal part S3 of the seal member S. This prevents the third seal part S3 from being subjected to excessive compressive pressure, whereby sufficient durability of the seal member S is obtained.

By providing the guiderails 314a and 314b and the guides 231a and 231b having the structures as thus explained, easier combination of the mechanical shutter 30 with the supporting member 23 of the optical block 20 is ensured. Separation of the mechanical shutter 30 from the optical block is accomplished by operation in reverse order to that described above. According to the present embodiment, the operations of combining the mechanical shutter 30 with the optical block 20 and removing the former from the latter can be performed easily. Therefore, maintenance operation of the imaging module 2 and replacement operation of the illumination adjustment unit can be easily and property executed.

The optical block 20 and the mechanical shutter 30 constitute the imaging module 2, with both of the optical block 20 and the mechanical shutter 30 being supported by the front base 5 (see FIG. 1 and FIG. 2). By this configuration, the mechanical shutter 30 is fixed to the optical block 20 securely.

As a method of supporting the optical block 20 and the mechanical shutter 30 by the front base 5, there may be a method of, for example, screwing the optical block 20 and the mechanical shutter 30 to the front base 5. However, there is no limitation to methods to be employed for this purpose as long as the secure support is ensured to these components. In the present embodiment, the guide frame 314 of the mechanical shutter 30 and the lens mount 21 of the optical block 20 are screwed to the front base 5.

In the present embodiment, since the mechanical shutter 30 is utilized as an illumination adjustment unit, vibration may arise when the light blocking mechanism is operated. In the present embodiment, in order to prevent such vibration from being transmitted to the front base 5, an elastic member or a vibration preventive member R is interposed at a mounting section between the main body 31 of the mechanical shutter 30 and the guide frame 314 (see FIG. 5). Like this, with the main body 31 being elastically supported by the front base 5 and the optical block 20 via the seal member S and the vibration preventive member R, positioning of the mechanical shutter 30 relative to the front base 5 and the optical block 20 is ensured, and enhanced insulation of the vibration is also accomplished.

As thus explained, according to the present embodiment, even a relatively large illumination adjustment unit, as represented by the mechanical shutter 30, can be combined with the optical block 20 properly and easily. This allows extra degrees of freedom in designing the structure of the illumination adjustment unit to be combined with the optical block 20, as well as better maintenance. Moreover, this makes it unnecessary to perform optical axis adjustment between the optical block 20 and the illumination adjustment part 32 after combining the illumination adjustment unit with the optical block 20. Hence, dust-proof and light blocking properties can be ensured.

Second Embodiment

Figure 8:
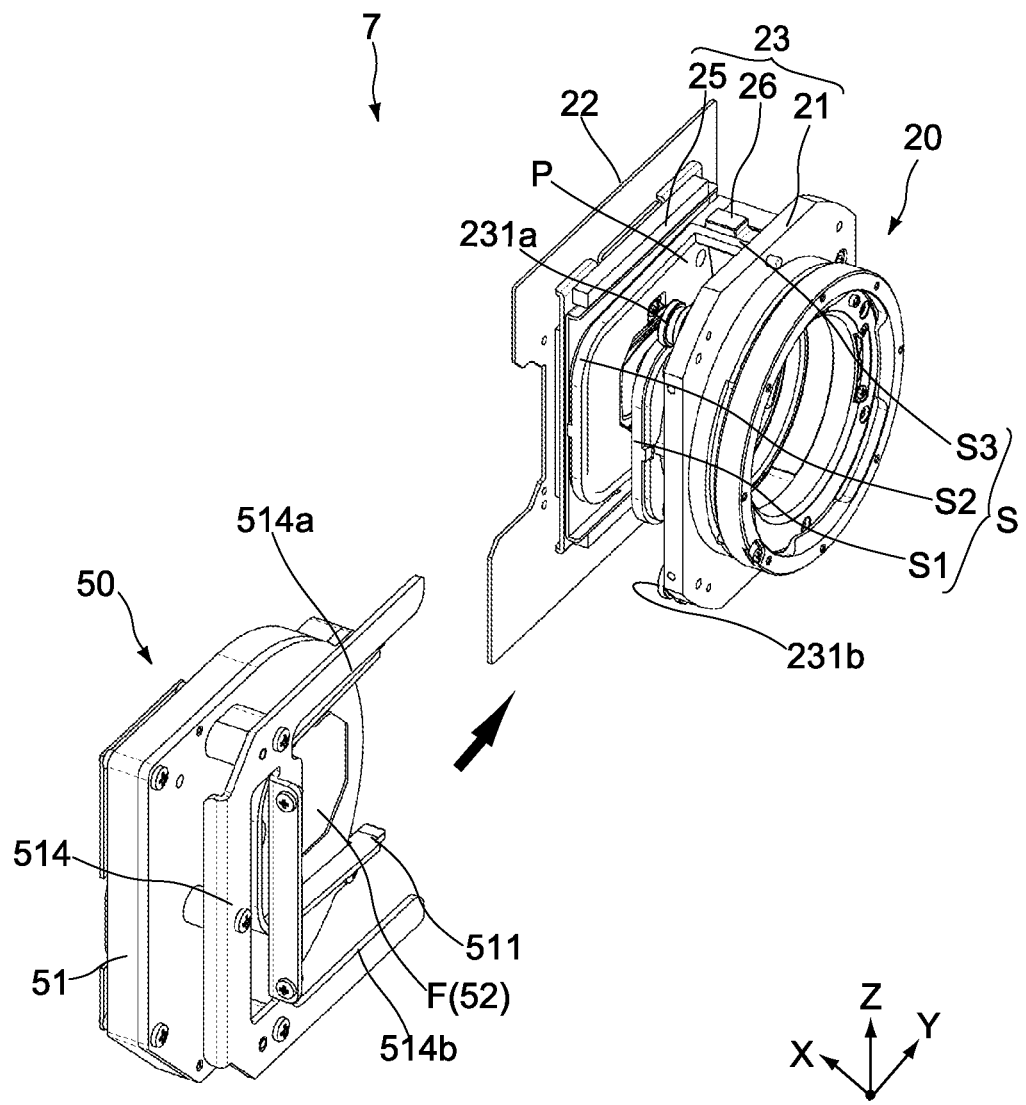
FIG. 8 is an exploded perspective view of a main part of an imaging module according to a second embodiment of the present disclosure.
Figure 9:
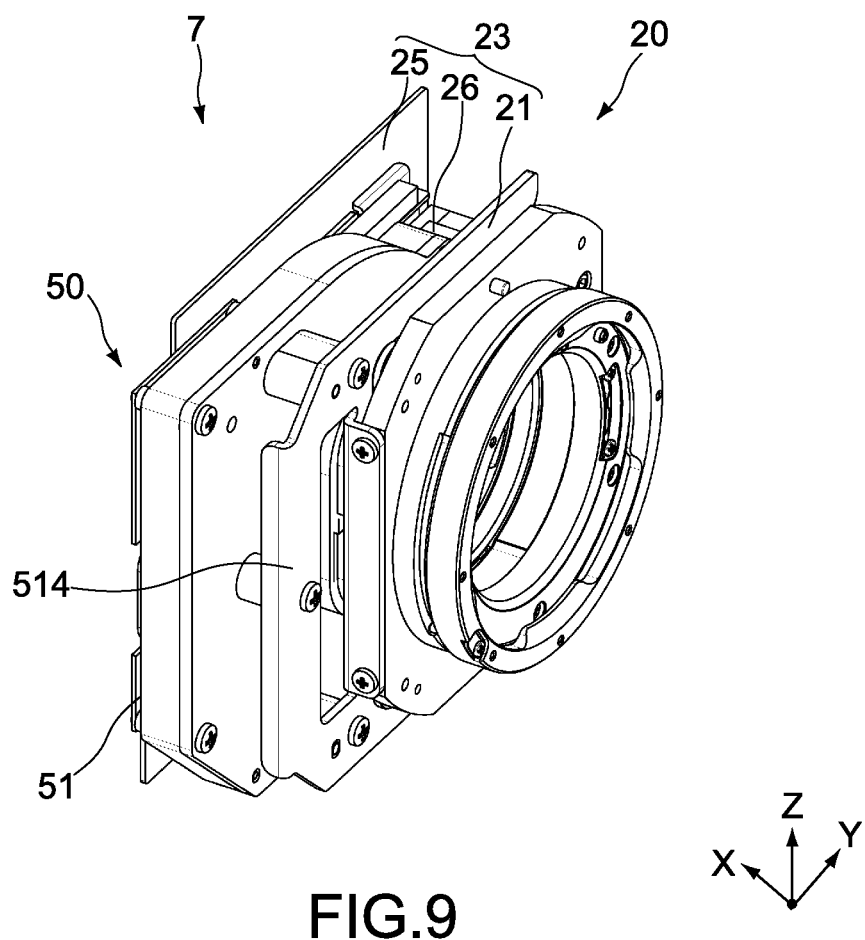
FIG. 9 is a perspective view of the imaging module according to the second embodiment of the present disclosure.

FIG. 8 and FIG. 9 are exploded perspective views of an imaging module 2 according to a second embodiment of the present disclosure. These figures respectively correspond to FIG. 6 and FIG. 7 explained in the first embodiment. In the second embodiment, explanation on configurations and functions identical to those in the first embodiment is omitted or simplified. Explanation in this embodiment mainly relates to configurations and functions that are different from those in the first embodiment.

An imaging module 7 in the present embodiment is housed inside an exterior body constituted by, similarly to the module in the first embodiment, the casing 3, the side cover 4, and the front base 5, which form an imaging apparatus.

In the imaging module 7, a filter unit 50 such as a neutral density filter is utilized as an illumination adjustment unit. The filter unit 50 has a main body 51 and an illumination adjustment part 52 formed as a partial section of the main body 51. The illumination adjustment part 52 is formed of an opening F formed in the main body 51 and a filter member (an illumination adjustment member) housed in the main body 51 and arranged on an optical axis of the optical block through the opening F. At the peripheral edge of the opening F, similarly to the first embodiment, a first engaging part 511 capable of engaging with the first supporting part 24 and a second engaging part capable of engaging with the second engaging part 25 of the optical block 20 are formed.

The filter unit 50 further has a guide frame 514. The guide frame 514 has a pair of guiderails 514a and 514b which engage with the guides 231a and 231b of the optical block 20 to guide the movement of the main body 51 in the Y axial direction. The imaging module 7 according to the present embodiment receives guiding functions executed by the guides 231a and 231b and the guiderails 514a and 514b. Therefore, the filter unit 50 can be inserted into or removed from the optical block 20.

In the imaging module 7 according to the present embodiment, with the lens mount 21 and the guide frame 514 being screwed together, the optical block 20 and the filter unit 50 are integrated as a unified unit. A fixing part of fixing the imaging module 7 to the front base 5 may be provided at the guide frame 514 or the lens mount 21.

The embodiments of the present disclosure have been explained as above, but the present disclosure is not limited to these embodiments, and may be variously modified within the technical idea of the present disclosure.

For example, in the above embodiments, the CMOS imager is used as an imaging element, but in place of this imager, a CCD imager may be used.

Also, in the above embodiments, a camera for capturing video images is used as an example of the imaging apparatus 1, but the present disclosure is applicable to a camera for capturing still images.

Moreover, in the above embodiments, a mechanical shutter or a filter unit is used as an example of an illumination adjustment unit, but the present disclosure is not limited to such embodiments, and a Copal Square shutter, a focal-plane shutter, or the like may be used as an illumination adjustment unit.

The present disclosure may employ the following configurations.

(1) An imaging apparatus including:
an optical lens having an optical axis in a first axial direction;
an imaging element facing the optical lens in the first axial direction;
an illumination adjustment unit having an illumination adjustment part adjusting a luminous flux incident on the imaging element from the optical lens, with the illumination adjustment part being arranged on the optical axis by being inserted between the optical lens and the imaging element in a second axial direction orthogonal to the first axial direction; and
a supporting member having a first supporting part supporting the optical lens, a second supporting part supporting the imaging element, and a coupling part coupling the first supporting part and the second supporting part to each other, the supporting member being configured to form a space, into which the illumination adjustment unit is inserted in a third axial direction orthogonal to the first axial direction and the second axial direction, with the space being formed by the first supporting part, the second supporting part, and the coupling part.

(2) The imaging apparatus according to (1) above, in which
the imaging element is a complementary metal oxide semiconductor (CMOS) imager, and
the illumination adjustment unit is a mechanical shutter having a light blocking mechanism blocking, as the illumination adjustment part, the incident luminous flux at a predetermined cycle (3) The imaging apparatus according to (1) above, in which the illumination adjustment part is a filter adjusting a light quantity of the incident luminous flux.

(4) The imaging apparatus according to any one of (1) to (3) above, in which the illumination adjustment unit further has a main body including a first engaging part engaging with the first supporting part, a second engaging part engaging with the second supporting part, and an insertion end facing the coupling part in the second axial direction.

(5) The imaging apparatus according to (4) above, in which
the illumination adjustment part has an opening formed in the main body to face the space, and an illumination adjustment member arranged on the optical axis via the opening, and
the first engaging part and the second engaging part are formed at a peripheral edge of the opening.

(6) The imaging apparatus according to (4) or (5) above, further including a seal member having a first seal part sealing a gap between the first supporting part and the first engaging part, a second seal part sealing a gap between the second supporting part and the second engaging part, and a third seal part sealing a gap between the coupling part and the insertion end.

(7) The imaging apparatus according any one of (4) to (6) above, in which
the illumination adjustment unit further has a pair of guiderails extending in the second axial direction to face each other in the third axial direction, with the illumination adjustment part being interposed therebetween, the pair of guiderails being fixed to the main body, and
the support member has guides engaging with the pair of guiderails respectively and guiding movement of the illumination adjustment unit in the second axial direction.

(8) The imaging apparatus according to any one of (1) to (7) above, further including a base supporting commonly the supporting member and the illumination adjustment unit.

(9) The imaging apparatus according to (8) above, in which the illumination adjustment unit further has an elastic member that is disposed between the base and the main body so that the main body is supported elastically by the base.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an optical lens with an optical axis in a first axial direction;
an imaging element facing the optical lens in the first axial direction;
an illumination adjustment unit having an illumination adjustment part configured to modify a luminous flux incident on the imaging element from the optical lens,
wherein the illumination adjustment part is arranged on the optical axis in a second axial direction orthogonal to the first axial direction and inserted between the optical lens and the imaging element; and
a supporting member comprising:
a first supporting part supporting the optical lens; and
a second supporting part supporting the imaging element,
wherein the supporting member is configured to form a space into which the illumination adjustment unit is inserted in a third axial direction orthogonal to the first axial direction and the second axial direction, and
wherein the illumination adjustment unit comprises a pair of guiderails extending in the second axial direction to face each other in the third axial direction, with the illumination adjustment part being interposed between the pair of guiderails,
wherein the illumination adjustment unit comprises a main body including a first engaging part engaging with the first supporting part, a second engaging part engaging with the second supporting part, and an insertion end facing a coupling part in the second axial direction, the coupling part coupling the first supporting part and the second supporting part with each other.

2. The imaging apparatus according to claim 1, wherein the imaging element is a complementary metal oxide semiconductor (CMOS) imager, and the illumination adjustment unit is a mechanical shutter having the illumination adjustment part, the illumination adjustment part comprising a light blocking mechanism that blocks the luminous flux incident on the imaging element in a predetermined cycle.

3. The imaging apparatus according to claim 1, wherein the illumination adjustment part is a filter adjusting a light quantity of the incident luminous flux.

4. The imaging apparatus according to claim 1, wherein the illumination adjustment part has an opening formed in the main body to face the space formed by the supporting member, and an illumination adjustment member arranged on the optical axis via the opening, and
wherein the first engaging part and the second engaging part are formed at a peripheral edge of the opening.

5. The imaging apparatus according to claim 1, further comprising a seal member having a first seal part sealing a gap between the first supporting part and the first engaging part, a second seal part sealing a gap between the second supporting part and the second engaging part, and a third seal part sealing a gap between the coupling part and the insertion end.

6. The imaging apparatus according to claim 1,
wherein the pair of guiderails is fixed to the main body of the illumination adjustment unit, and
wherein the supporting member comprises guides engaged with the pair of guiderails respectively to guide movement of the illumination adjustment unit in the second axial direction.

7. The imaging apparatus according to claim 1, further comprising a base supporting the supporting member and the illumination adjustment unit.

8. The imaging apparatus according to claim 7, wherein the illumination adjustment unit comprises:
an elastic member disposed between the base and the main body such that the elastic member insulates mechanical vibrations between the main body and the base.

9. The imaging apparatus according to claim 1, wherein the space is formed by the first supporting part, the second supporting part, and the coupling part.

10. The imaging apparatus according to claim 1, wherein the distance between the imaging element and a lens mount supporting the optical lens is defined by the coupling part coupling the first supporting part and the second supporting part to each other.

11. An imaging apparatus comprising:
an optical lens with an optical axis in a first axial direction;
an imaging element facing the optical lens in the first axial direction;
an illumination adjustment unit having an illumination adjustment part configured to adjust a luminous flux incident on the imaging element from the optical lens,
wherein the illumination adjustment part is arranged on the optical axis in a second axial direction orthogonal to the first axial direction by being inserted between the optical lens and the imaging element; and
a supporting member comprising:
a first supporting part supporting the optical lens,
a second supporting part supporting the imaging element, and
a coupling part coupling the first supporting part and the second supporting part to each other,
wherein the supporting member is configured to form a space into which the illumination adjustment unit is inserted in a third axial direction orthogonal to the first axial direction and the second axial direction, wherein the space is formed by the first supporting part, the second supporting part, and the coupling part,
wherein the illumination adjustment unit comprises a main body including a first engaging part engaging with the first supporting part, a second engaging part engaging with the second supporting part, and an insertion end facing the coupling part in the second axial direction,
wherein the illumination adjustment unit comprises a pair of guiderails extending in the second axial direction to face each other in the third axial direction, with the illumination adjustment part being interposed therebetween,
wherein the pair of guiderails are fixed to the main body of the illumination adjustment unit, and
wherein the supporting member comprises guides engaged with the pair of guiderails respectively to guide movement of the illumination adjustment unit in the second axial direction.

* * * * *